United States Patent

[11] 3,573,697

[72] Inventors Philip J. Dennis
 Lynn;
 Paul E. Gates, Danvers, Mass.
[21] Appl. No. 759,649
[22] Filed Sept. 13, 1968
[45] Patented Apr. 6, 1971
[73] Assignee Sylvania Electric Products Inc.

[54] HERMETICALLY SEALED CIRCUIT BREAKER
 5 Claims, 1 Drawing Fig.
[52] U.S. Cl. .................................................. 337/89,
 337/372, 337/380
[51] Int. Cl. ..................................................... H01h 37/04
 H01h 37/54, H01h 61/01
[50] Field of Search .................................. 337/85, 89,
 102, 107, 112, 362, 365, 372, 379, 380; 335/154;
 174/50.58, 50.61

[56] References Cited
 UNITED STATES PATENTS
3,261,939  7/1966  Prival ........................... 335/154
2,828,386  3/1958  Malone ......................... 337/89
1,093,997  4/1914  Kraus ............................ 174/50.61X
3,278,705  10/1966 Dennis .......................... 337/380X
2,647,189  7/1953  DuPuy ........................... 337/365
2,426,463  8/1947  McKinzie ...................... 337/89X
2,035,426  3/1936  Field ............................. 337/107X
 FOREIGN PATENTS
605,950  8/1948  Great Britain ................. 337/101

Primary Examiner—Bernard A. Gilheany
Assistant Examiner—Dewitt M. Morgan
Attorneys—Norman J. O'Malley and James Theodosopoulos ABSTRACT: A circuit breaker having high amperage capacity includes a metallic snap-action element, capable of opening an electrical circuit upon thermal or current overload, disposed within a sealed glass envelope. Two metallic tubes are sealed to, and pass through, one end of the envelope. Lead-in conductors, which also serve as supporting members for the breaker assembly, extend through, and are sealed to, the metallic tubes.

Patented April 6, 1971
3,573,697
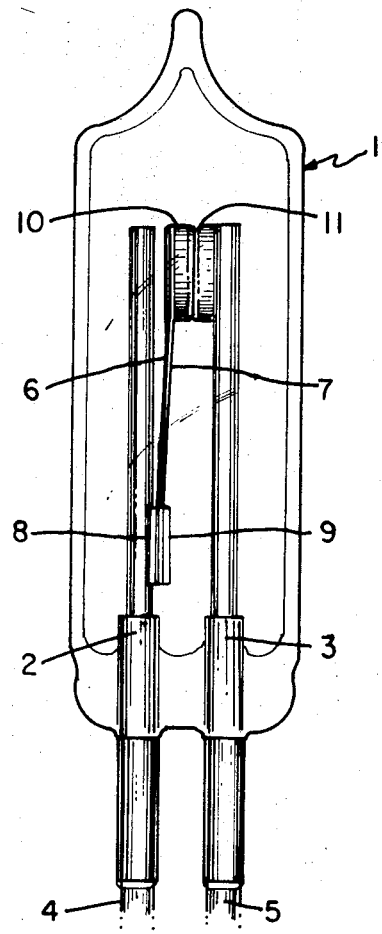
PHILIP J. DENNIS
PAUL E. GATES
INVENTORS
BY James I. Theodosopoulos
AGENT

HERMETICALLY SEALED CIRCUIT BREAKER

BACKGROUND OF THE INVENTION

1. Field of the Invention

This invention pertains to protective devices for nonpermanent interruption of an electrical circuit when the control element of the device attains a predetermined temperature, resulting either from current overload or thermal rise. More particularly it relates to such devices for use with high current electrical equipment in which overloading can be destructive to such equipment. Examples of such equipment are electric motors having a rating of more than about 1 or 2 horsepower.

2. Description of the Prior Art

Circuit breakers are commonly used in different applications and environments, such as in motors and refrigeration systems. For example, when used to protect motors, they may be attached externally to the motor housing or internally to the stationary field coils.

When used in refrigeration systems, they may be installed in the high pressure line of a compressor, where they can be subjected to pressures about 1,000 pounds per square inch. Such breakers must be hermetically sealed to prevent any contact between the refrigerant and the internal elements of the breaker since such contact might impair the reliability of the breaker. It is also undesirable to subject the refrigerant to the arcs that occur when the breaker opens.

Hermetically sealed breakers for such applications have commonly been encapsulated in metal containers. However in order to adequately insulate the lead-in wires, glass headers were usually used through which the lead-in wires passed. However, such devices were difficult to hermetically seal and expensive to manufacture. In addition, the metal container usually required an insulating covering and, furthermore, had excessive mass which resulted in an undesirable thermal lag.

In a copending application, Ser. No. 724,211, filed on Apr. 25, 1968, by P.J. Dennis, entitled "Circuit Breaker," and assigned to the same assignee as the instant application, a hermetically sealed glass enclosed circuit breaker is shown. However, the breaker disclosed therein has a capacity of only about 12 amperes per pair of lead-in wires, because said wires are sealed directly to the glass envelope. The instant application relates to a breaker having a higher current capacity.

BACKGROUND OF THE INVENTION

An electrical control device in accordance with this invention comprises a thermostatic snap action metallic element, which opens and interrupts an electrical circuit when the element attains a predetermined temperature. Either excessive current or ambient heat will actuate, or snap, the element. The element will then remain open until it has cooled to a predetermined temperature, usually about 5° to 50° C. below its opening temperature, at which point it will close and permit resumption of current flow.

Under normal operation, that is, when the snap element is closed, it is in electrical junction with a contact button attached to a substantially rigid lead-in and support wire. Rigidity is desired in the wire to prevent substantially any movement or displacement thereof during the useful life of the device. Such movement could undesirably alter the calibration or actuating temperature of the circuit breaker.

Preferably the snap element also has a contact button at its electrical junction point. Such contacts, when made of suitable low resistance metals, such as silver-clad copper, are resistant to the electrical arcs that occur therebetween and are, therefore, durable and long lived.

In order to prevent excessive arcing, especially when the device is situated in an alternating magnetic field, the snap element movement, upon opening, is limited by a mechanical stop behind the element. The stop is positioned in such a manner that it permits the element to snap open at the actuating temperature but limits the gap between the open contacts. That is, the gap should be generally only large enough to prevent a voltage breakdown thereacross due to the normal operating voltage of the device which is, usually, 120 volts or 240 volts AC although the gap may be larger in order to meet certain safety requirements. For example, if it is desired that the open contacts can withstand about 1,480 volts thereacross, the gap can be about 3 mils. The reason for the desired proximity of the contacts, at an opened condition, is this: it is possible for a peak voltage greater than that of the operating voltage to be induced across the opening contacts by the environmental magnetic field. This peak voltage would occur at about the same rate as the line frequency, usually 60 cycles, and thus the tendency of the arcing would be to occur at approximately the same intervals as the 60 cycle peaks. However, the arc must be at a minimum temperature of about 3,000° K. in order to maintain itself. The effect, then, of having proximate contacts is to cool, and therefore extinguish, the arc to a greater extent than contacts having a greater separation.

Preferably, for simplicity of manufacture and to minimize the number of elements comprising the circuit breaker, a lead-in wire also comprises the mechanical stop. The lead-in wire is positioned with its upper end extending into the breaker envelope about the same distance as the upper or contact end of the snap element. The upper end of the lead-in wire is positioned behind the snap element and spaced therefrom the proper distance, as mentioned above, to limit the movement of the contact end of the snap element upon opening thereof. The lower end of the snap element is fastened, such as by welding, to an intermediate point of the lead-in wire.

The lead-in wires are preferably made of low-resistivity, high-strength metal, such as copper-clad steel or phosphor-bronze alloy, to permit passage therethrough the high amperage with little resistance heating. In addition, the diameter of the wire must be large enough to satisfactorily accommodate a predetermined current flow. This combination of requirements does not, in many cases, permit a direct seal of the lead-in wire to a glass envelope as discussed in Background of the Invention. In our invention the lead-in wire passes through, and is sealed to, a suitable metal tube which, in turn, is sealed to the glass envelope. The metal tube has a coefficient of expansion similar to that of glass in order to permit a satisfactory glass-to-metal seal therebetween. In addition, the metal tube must be capable of hermetic connection, such as by brazing or soldering, to the lead-in wire. Preferably, also, the clearance between the tube and lead-in wire must be sufficient to permit insertion of the wire through the tube but not so excessive as to result in a weak sealed joint therebetween.

In the manufacture of a device according to this invention, one end of an open-ended glass tube is press-sealed around two such metal tubes. The tubes are spaced apart from each other and extend for a short distance internally and externally of the glass envelope. This press-sealing operation usually requires a larger amount of heat than any other operation involved in the manufacture of the device and is, therefore, preferably performed prior to insertion of the breaker assembly into the envelope in order to prevent metal oxidation thereof or an undesirable change in the actuating temperature of the snap element.

A lead-in wire is then inserted through each tube, the length of each wire being sufficient so that the ends thereof protrude beyond both ends of each tube. Each wire is then hermetically joined to the lower end of each tube, such as by brazing or soldering. Prior to insertion of the lead-in wires, the internal components of the breaker have been affixed thereto as previously mentioned, that is to say, one of the lead-in wires has a contact button connected to its internal end and the other lead-in wire has the snap element assembly attached thereto.

Preferably, a shunt is connected in parallel with the snap element to bypass a portion of the current flow. Such an arrangement improves the sensitivity and response of the snap element to overload conditions. The shunt comprises a thin flexible strip of a suitably conductive metal and is about the same length as the snap element. Only the upper and lower ends of the shunt are connected, such as by welding, to the respective upper and lower ends of the snap element. Thus the shunt does not interfere with the lateral movement of the snap element, since the dish-shaped snapping portion of the element is intermediate the ends thereof and is not impeded by the connections at the ends.

Preferably, when the lower end of the snap element and shunt assembly is fastened to the appropriate lead-in wire, weld tabs are also attached to the welding point of each surface of the assembly, that is to say, one tab bears against the snap element and one tab bears against the shunt. The weld tabs comprise small flat sections of a suitable metal, such as nickel, and their purpose is to facilitate the welding of the assembly to the lead-in wire. This is desirable when the thickness of the snap element and shunt is small in comparison to the thickness of the lead-in wire and a satisfactory weld might not be otherwise obtained. The weld tabs permit the assembly to be welded to the lead-in wire without risk of burning a hole through the assembly.

Preferably, also, when the assembly includes weld tabs, the lead-in wire is undercut at the point of connection to the assembly. The depth of the undercut is approximately the thickness of the welding tab and its purpose is to maintain a predetermined distance between the contact end of the snap element and the lead-in wire therebehind which serves as the previously mentioned mechanical stop. For example, it may be desired that the mechanical stop distance be about equal to the distance that the slightly curved snap element deviates from a straight line, say, for the purpose of illustration, about 0.080 inch. Then, for a weld tab that is 0.020 inch thick, the lead-in wire would be undercut to about 0.020 inch and the 0.080-inch stop distance would thus be maintained.

After the lead-in wires of the breaker assembly have been inserted through the metal tubes at the lower end of the glass envelope as previously mentioned, the lead-in wires are hermetically connected to the metal tubes such as by brazing. A sufficient length of the lead-in wires extend externally beyond the metal tubes to serve as electrical connectors in the apparatus to be protected. The breaker assembly is supported within the glass envelope by the internally extending portions of the lead-in wires.

While the envelope end is still open, the breaker is calibrated. The open end is then sealed by tubulating and tipping off the glass.

BRIEF DESCRIPTION OF THE DRAWING

The single FIGURE is an elevational view of a circuit breaker in accordance with this invention.

DESCRIPTION OF THE PREFERRED EMBODIMENT

A circuit breaker in accordance with this invention comprises, as shown in the drawing, a glass envelope 1 at the lower end of which are parallely embedded tubes 2 and 3. In a specific example for a breaker rated at 95 amperes, envelope 1 was 2½ inches long by ½ inch diameter. Tubes 2 and 3 were made of Kovar, a glass-sealing alloy consisting essentially of 20 percent nickel, 17 percent cobalt, 0.2 percent manganese and the balance iron, and were eleven-sixteenths inch long by 0.080 inch inside diameter. About five-sixteenths inch of tubes 2 and 3 protruded externally of envelope 1.

Lead-in wires 4 and 5 were made of copper-clad steel and were 2½ inches long by 0.075 inch diameter. Wires 4 and 5 passed through tubes 2 and 3, respectively, and were brazed thereto at the lower ends of tubes 2 and 3 with about one-half inch of wires 4 and 5 extending below tubes 2 and 3. About 1 ⅝ inches of wires 4 and 5 extended parallely within envelope 1.

Fastened to lead-in wire 4 at a point about seven-eighths inch from the upper end thereof was a snap element assembly consisting of snap element 6, shunt 7, weld tabs 8 and 9, and contact button 10. At the point of fastening, lead-in wire 5 was undercut to a depth of 0.012 inch for a span of one-fourth inch.

Snap element 6 was a laminated thermostatic metal such as shown in U.S. Pat. No. 3,278,705 entitled "Thermostatic Switch," issued on Oct. 11, 1966 to Dennis and assigned to the same assignee as the instant application. Element 6 comprised metal laminae having different coefficients of thermal expansion and had a dish-shaped portion at about the center thereof which caused the snapping action of the element when it was heated to a predetermined temperature. Element 6 was 0.84 inch long by 0.40 inch wide by 0.0006 inch thick.

Shunt 7 was a strip of copper foil, 0.002 inch thick by 0.25 inch wide, and was about the same length as element 6. Weld tabs 8 and 9 were ⅛ inch squares of nickel metal, about 0.023 inch thick. The surfaces of the tabs were embossed in a diamond-shaped pattern to improve the contact on welding. Contact button 10 was 0.25 inch diameter by 0.059 inch thick and was made of silver-clad copper on steel.

To assemble and fasten the snap element assembly, shunt 7 was longitudinally and centrally placed on element 6. Tabs 8 and 9 were centrally placed at the lower end of the exposed surfaces of element 6 and shunt 7, respectively, and were then spot welded. Contact button 10 was centrally positioned at the upper end of shunt 7 and was spot welded thereto, thereby also welding shunt 7 to element 6.

The snap element assembly was then longitudinally positioned on lead-in wire 4 with tab 8 being in immediate contact with the undercut section thereof and was welded thereto. The upper end of element 6 extended to about the upper end of lead-in wire 4 and was spaced therefrom abut three thirty-seconds inch. Thus, lead-in wire 4 would limit the movement of the upper end of the snap element, upon opening thereof, to three thirty-seconds inch.

Contact button 11 was welded to the upper end of lead-in wire 5 and was in physical contact with contact button 10 with sufficient pressure to establish electrical connection therebetween. However, the pressure was insufficient to cause button 11 to substantially follow button 10 upon actuation of the snap element.

The envelope was then sealed by tabulating the open end thereof and then tipping it off.

To illustrate the flexibility in the design of circuit breakers made according to this invention, where sealability of the lead-in wires to glass is not required and thus does not limit the choice of materials used in the construction thereof, mere changes in the composition of lead-in wire 5 can be sufficient to change the rating of the device. This is because the $I^2R$ loss in lead-in wire 5 is the major heat contributor to snap element 6. Thus, for example, in a particular circuit breaker, lead-in wire 5 was made of copper-clad steel having a resistivity of about 20 ohms per circular mil foot and the breaker had a rating of 30 amperes. However, when 01010 carbon steel, having a resistivity of about 70 ohms per foot, was substituted for the copper-clad steel, the breaker's rating was reduced to 23 amperes. Thus a circuit breaker of a given design can be produced to have different ratings by appropriate changes in the composition of lead-in wire 5.

We claim:

1. A circuit breaker comprising: a hermetically sealed glass envelope; two spaced-apart metal tubes sealed to one end of said envelope and extending internally and externally of said envelope, said metal tubes being readily sealable to glass; a metal lead-in wire disposed within each of said metal tubes and being hermetically joined thereto and extending beyond the ends thereof, the metal of said lead-in wire having greater electrical conductivity than the metal comprising said metal tubes; and a thermostatic snap acting metallic element disposed within said envelope and being affixed to the first of said lead-in wires at a point intermediate the internal end thereof and said end of said envelope, said element normally being in electrical contact with the second of said lead-in wires.

2. The circuit breaker of claim 1 comprising, in addition, a flat metallic shunt disposed substantially parallely on said element and joined thereto at the ends thereof.

3. The circuit breaker of claim 1 wherein said first lead-in wire has an undercut at the point of affixation to said element.

4. The circuit breaker of claim 1 wherein said first lead-in wire has an undercut at the point of affixation to said element and comprising, in addition, a metal tab welded to said element at said point of affixation.

5. The circuit breaker of claim 1 wherein the upper end of said first lead-in wire is closely spaced from the movable end of said element and is a mechanical arc-suppressing stop therefor.